June 28, 1932. J. L. BABER, JR 1,865,074
ARTICLE HANDLING MECHANISM
Filed Nov. 27, 1928 7 Sheets-Sheet 1

INVENTOR
John L. Baber, Jr.
BY
Roberts, Cushman & Woodberry
ATTORNEYS

June 28, 1932.  J. L. BABER, JR  1,865,074
ARTICLE HANDLING MECHANISM
Filed Nov. 27, 1928  7 Sheets-Sheet 2
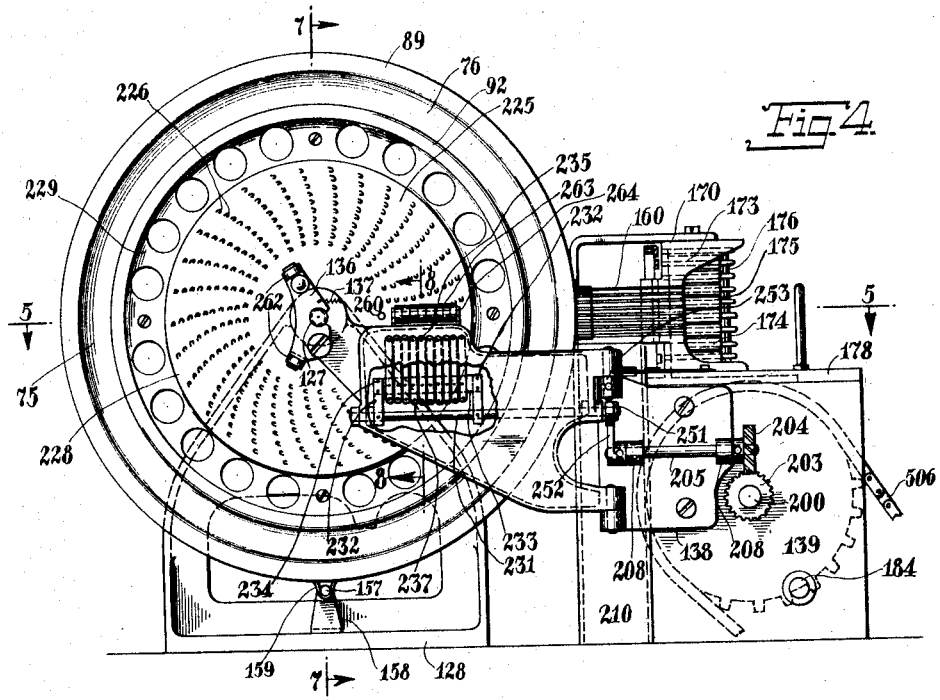
Fig. 4.
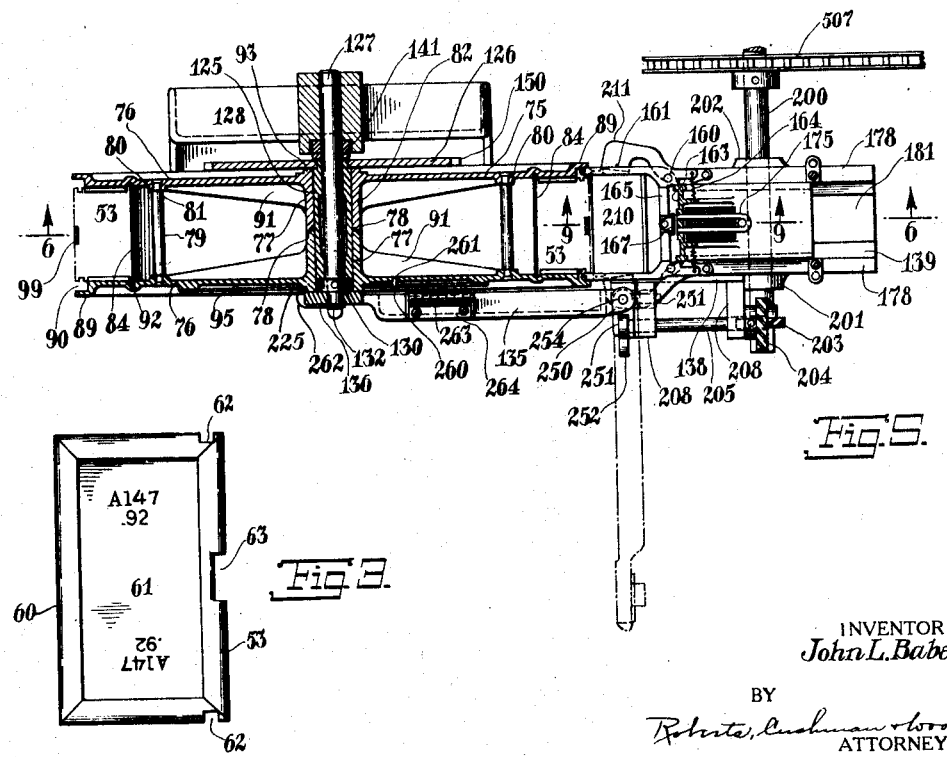
Fig. 5.
Fig. 3.
INVENTOR
John L. Baber, Jr.
BY
Roberts, Cushman & Woodberry
ATTORNEYS June 28, 1932.  J. L. BABER, JR  1,865,074
ARTICLE HANDLING MECHANISM
Filed Nov. 27, 1928  7 Sheets-Sheet 3
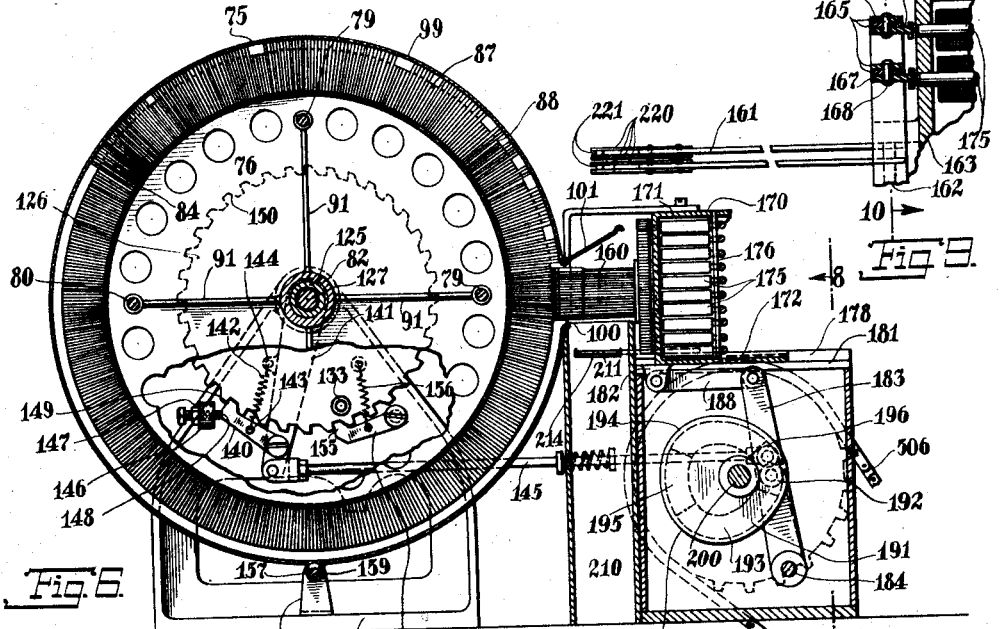
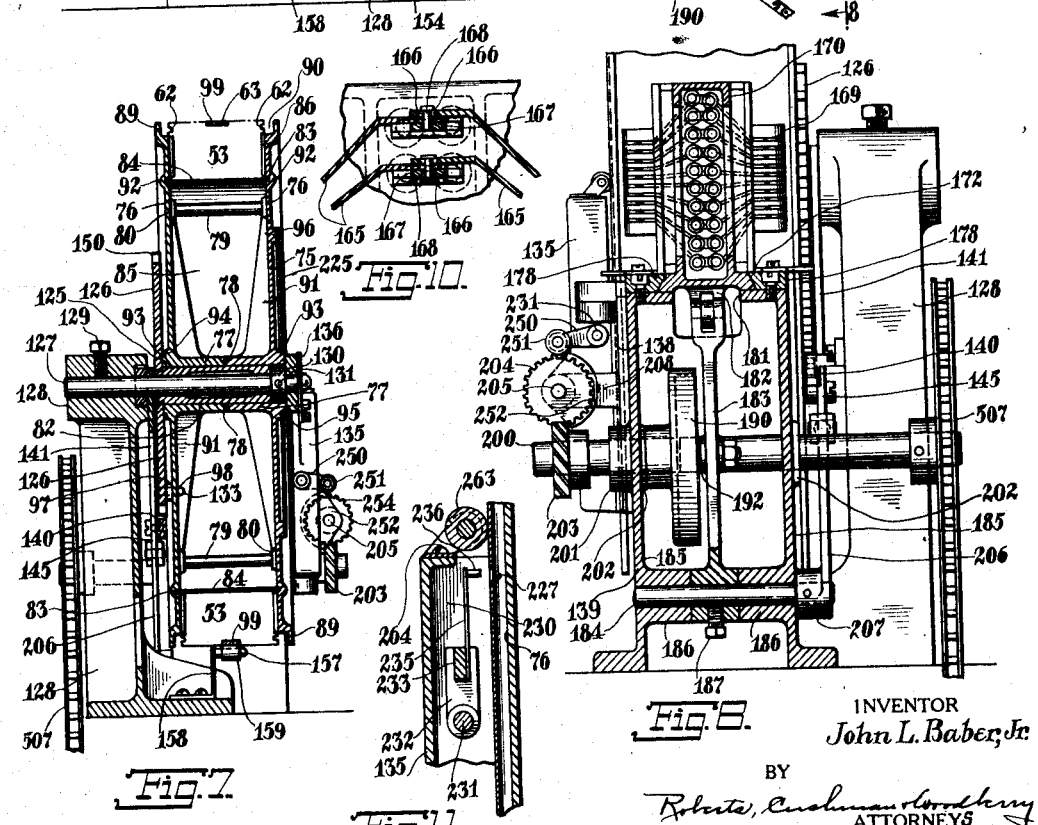
INVENTOR
John L. Baber, Jr.
BY
Roberts, Cushman Woodberry
ATTORNEYS June 28, 1932.  J. L. BABER, JR  1,865,074
ARTICLE HANDLING MECHANISM
Filed Nov. 27, 1928   7 Sheets-Sheet 4

INVENTOR
John L. Baber, Jr.
BY
Roberts, Cushman + Woodberry
ATTORNEYS

June 28, 1932.  J. L. BABER, JR  1,865,074
ARTICLE HANDLING MECHANISM
Filed Nov. 27, 1928   7 Sheets-Sheet 5
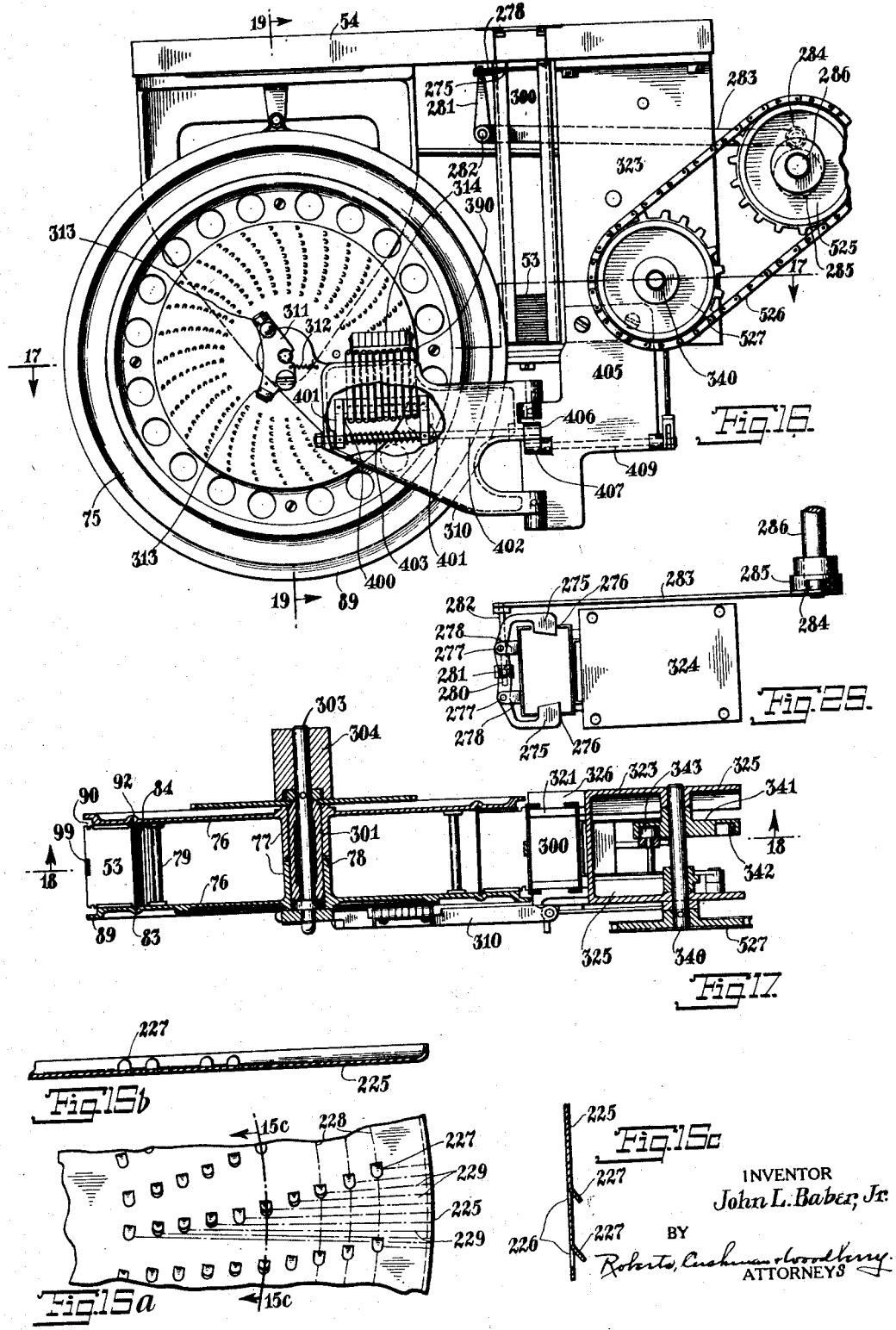

June 28, 1932.  J. L. BABER, JR  1,865,074
ARTICLE HANDLING MECHANISM
Filed Nov. 27, 1928  7 Sheets-Sheet 6

INVENTOR
John L. Baber, Jr.
BY
Roberts, Cushman + Woodbury
ATTORNEYS

June 28, 1932.  J. L. BABER, JR  1,865,074
ARTICLE HANDLING MECHANISM
Filed Nov. 27, 1928  7 Sheets-Sheet 7
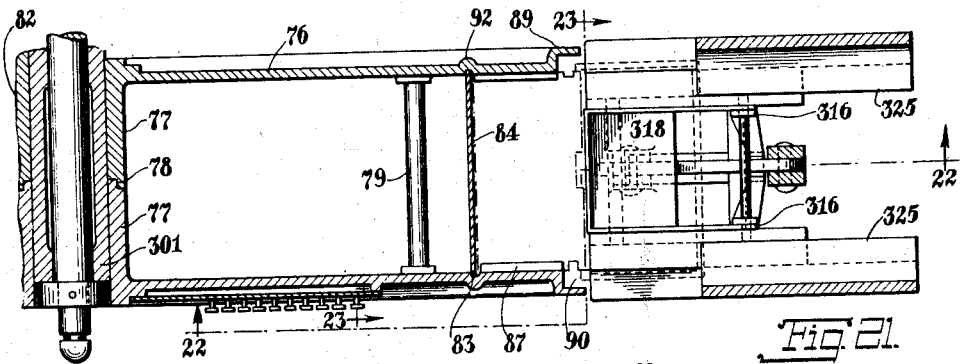
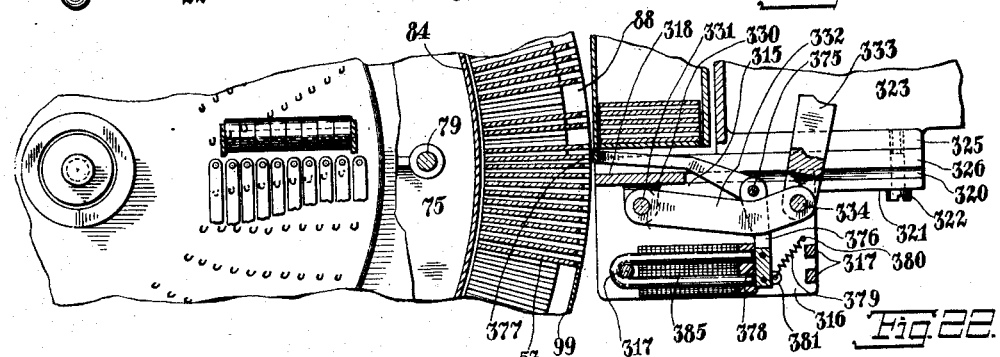
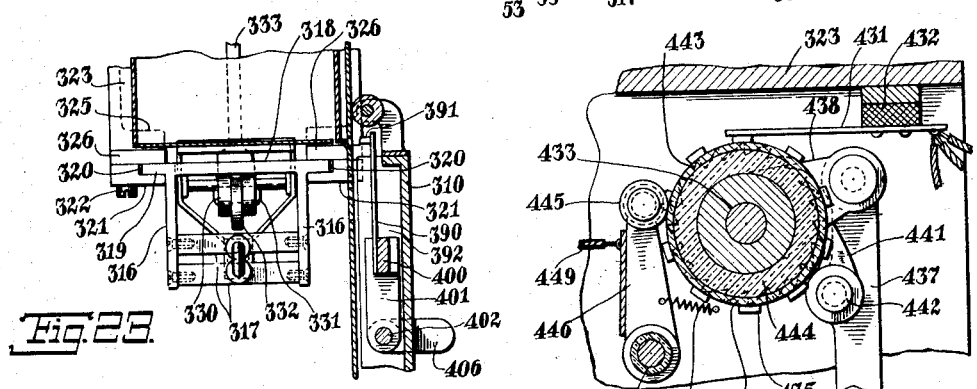
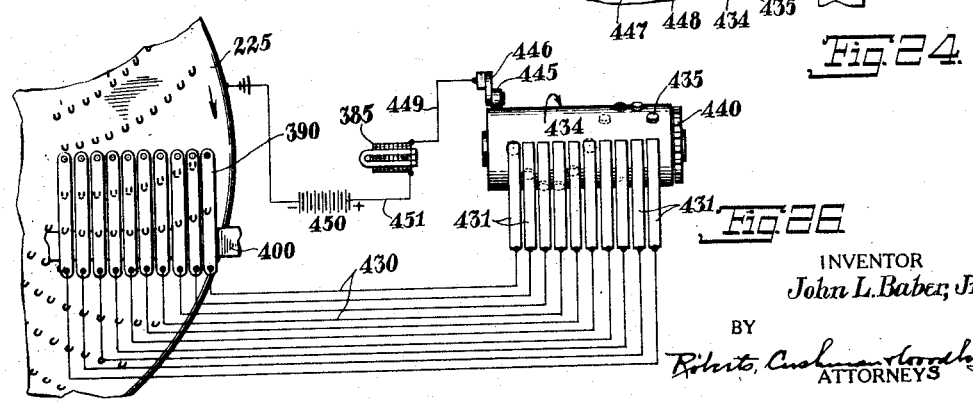
INVENTOR
John L. Baber, Jr.
BY
ATTORNEYS Patented June 28, 1932

1,865,074

UNITED STATES PATENT OFFICE

JOHN L. BABER, JR., OF NEW YORK, N. Y., ASSIGNOR TO BABER COMPANY, OF BOSTON, MASSACHUSETTS, A CORPORATION OF MASSACHUSETTS

ARTICLE HANDLING MECHANISM

Application filed November 27, 1928. Serial No. 322,248.

The invention hereinafter set forth and described relates briefly to means for selecting certain articles in a group, extracting such selected articles from the group, employing the articles in any desired manner and finally filing the selected articles back into the group from which they were extracted. All of the various operating mechanisms are so coordinated that the separate mechanisms need under ordinary conditions no independent attention. Moreover, the selecting, extracting and filing mechanisms are controlled by certain factors which may be adjusted at will so that while their operations are at all times coordinated they may be changed as a unit to suit varied conditions.

While this invention obviously is applicable to many uses, it is here described and shown as employed in connection with means for selecting printing plates in a magazine, removing them from the magazine, feeding them to a plate printing machine, and refiling the plates in the magazine in the positions from which they were removed, such showing, however, being merely illustrative and not limitative.

The elected showing may be described briefly as comprising a magazine having a plurality of pockets carrying printing plates, a selector mechanism by which certain plates are selected and removed from the magazine, a printing mechanism which operates upon the selected plates, and a filing mechanism by which the selected plates are replaced in the pockets of the magazine from which they were removed. Prior to this invention it has been necessary when printing from plates stored in a magazine to pass all the plates in the magazine through the printing mechanism, although only certain plates were to be operated thereon. The application of this invention, however, eliminates the necessity of passing any but the plates actually operated upon through the printing mechanism.

The primary object of this invention resides in providing means for selecting certain articles of a group, removing the selected articles from the group and refiling the articles in the places in the group from which they were removed.

Another object of this invention is to provide an automatic control for such operations, such control being preferably but not necessarily of the electromechanical type, whereby the selecting, removing and refiling operations may be carried on in their proper sequence without further attention on the part of the operator.

A further object of this invention is to provide a control plate including a plurality of independent control factors which may be set so that certain predetermined articles only may be handled, the setting of the factors being varied at the will of the operator.

Other objects of this invention will be apparent to one skilled in the art from a consideration of the following specification and claims taken in conjunction with the drawings which form a part of and to which reference is made in the specification as disclosing the elected application of the invention and comprising the following figures:

Fig. 3 is a plan view of one form of printing plate that may be employed in the assembly;

Figure 14:
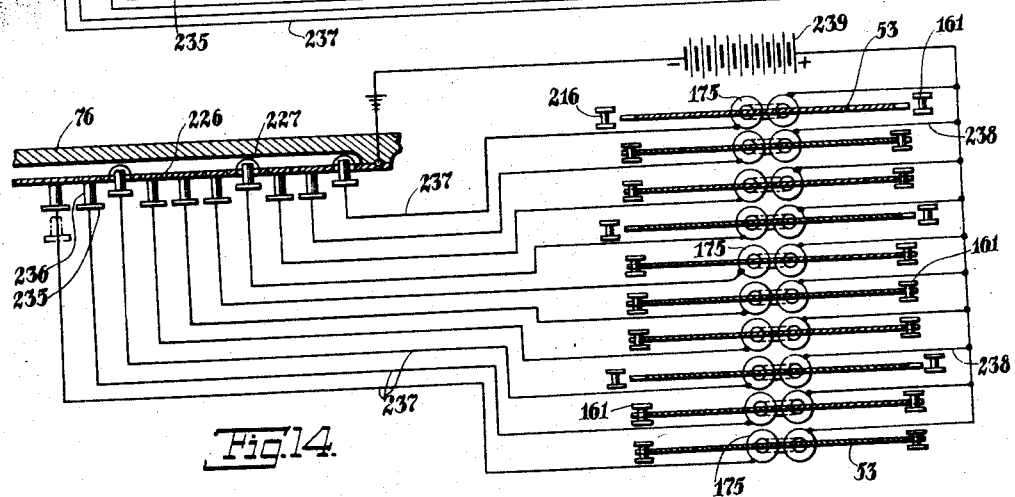
Figure 27:
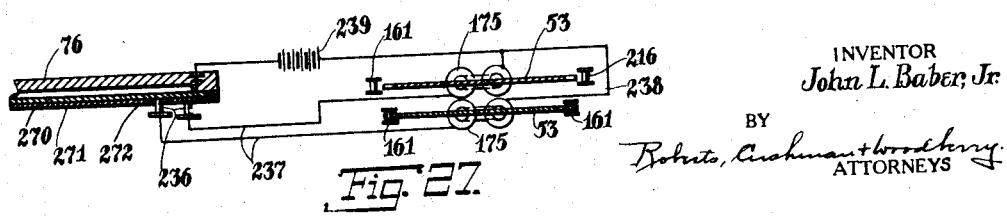
Figure 18:
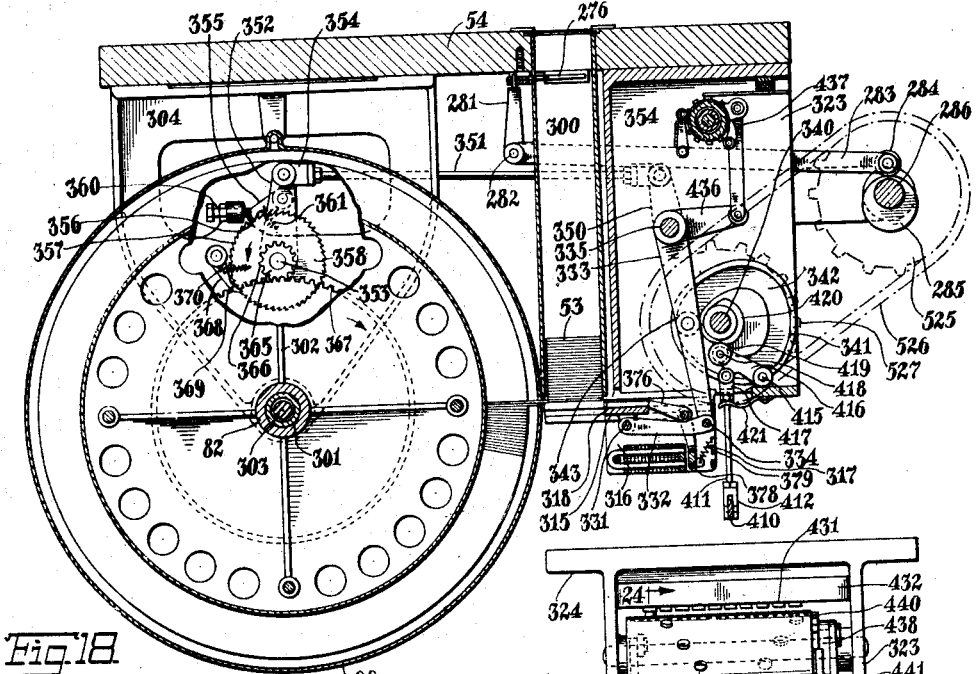
Figure 19:
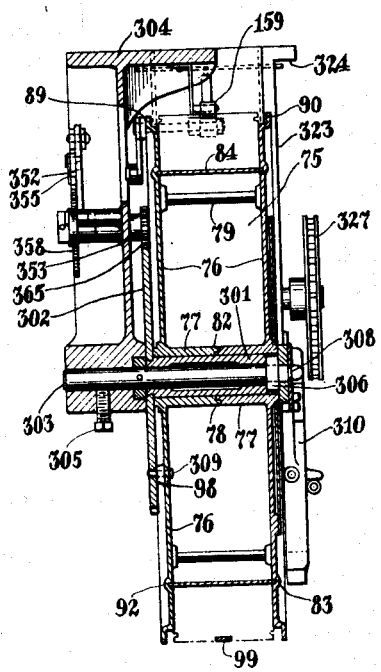
Figure 20:
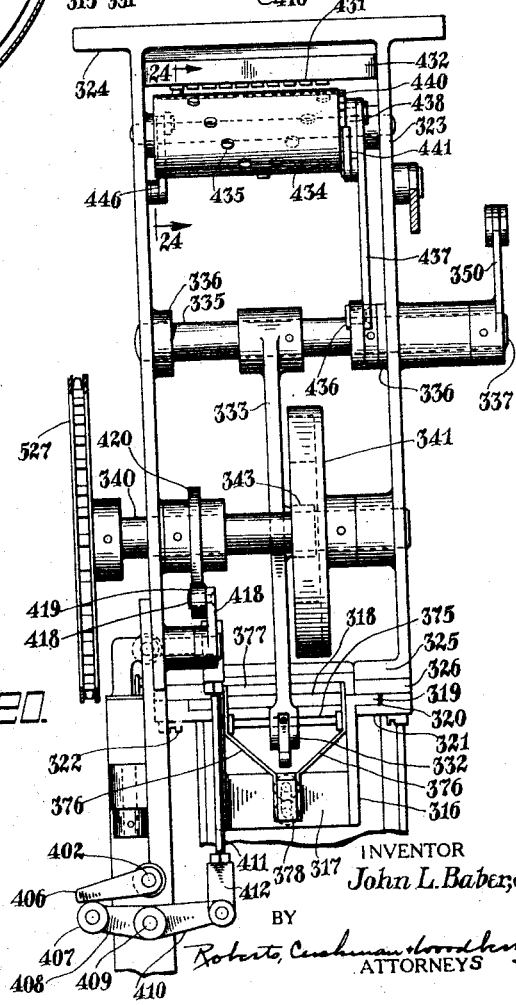

Figs. 4 to 13 inclusive relate to the article selector mechanism: Fig. 4 being a side elevation with parts broken away; Fig. 5 being a sectional view taken along the line 5—5 in Fig. 4; Fig. 6 being a sectional view taken along the line 6—6 in Fig. 5 with parts broken away; Fig. 7 being a sectional view taken along the line 7—7 in Fig. 4; Fig. 8 being a sectional view taken along the line 8—8 in Fig. 6 on an enlarged scale; Fig. 9 being an enlarged sectional view of the gripper mechanism taken along the line 9—9 in Fig. 5; Fig. 10 being a sectional view taken along the line 10—10 in Fig. 9; Fig. 11 being an enlarged sectional view of a detail of the mechanism; and Figs. 12 and 13 being enlarged sectional plan views of a portion of the mechanism illustrating two positions of the gripper mechanism;

Fig. 14 is a diagrammatic view of the electro-mechanical control as applied to the selector mechanism;

Figs. 15a 15b and 15c are fragmentary elevational and sectional views of the mechanism which includes the factors which control the electromechanical elements;

Figs. 16 to 24 inclusive relate to the article filing mechanism; Fig. 16 being a side elevation with parts broken away; Fig. 17 being a sectional view taken along the line 17—17 in Fig. 16; Fig. 18 being a sectional view taken along the line 18—18 in Fig. 17 with parts broken away; Fig. 19 being a sectional view taken along the line 19—19 in Fig. 16; Fig. 20 being an enlarged end elevation; Fig. 21 being a sectional plan view on an enlarged scale of a portion of the mechanism; Fig. 22 being a sectional view taken along the line 22—22 in Fig. 21; Fig. 23 being a sectional view taken along the line 23—23 in Fig. 21; and Fig. 24 being an enlarged sectional view of the commutating factor of the electromechanical control;

Fig. 25 is an enlarged plan view illustrating a detail of the hopper mechanism;

Fig. 26 is a diagrammatic view of the electromechanical control as applied to the filing mechanism; and Fig. 27 is a fragmentary diagrammatic view of a modification of control mechanism shown as applied to the selector mechanism.

The assembly elected for illustration in the drawings comprises a selecting mechanism 50, a printing mechanism 51 and a filing mechanism 52 by which printing plates 53 are handled. The selecting and printing mechanisms are mounted upon a table 54 while the filing mechanism depends therefrom. The plates 53 are transferred from the selecting mechanism to the printing mechanism and from the printing mechanism to the filing mechanism by any suitable form of feeding means 55.

The invention herein set forth relates to the handling of the plates by the selecting and filing mechanisms, the printing mechanism per se forming no part of the present invention. For the purpose, however, of a full showing of the selected application of the invention there is disclosed in the drawings a printing machine of the addressing type in which the platen is arranged to operate simultaneously upon two successive plates. The plates 53 may be of any desired form and for the purpose of this invention are shown as having a continuous frame 60 within which is mounted a stencil 61 of the usual type. On each end of the frame 60 near one side thereof are provided a pair of notches 62 while in the side adjacent the notches 62 and midway of its length is provided a depression 63. The purpose of these notches and depressions will be set forth later.

A supply of suitably prepared printing plates 53 are enclosed within a magazine 75 from which certain predetermined plates are selected and removed by the mechanism to be described. The magazine 75 is shown in the form of a drum having a pair of plates or disks 76 which form the sides of the magazine. Each disk 76 has a central aperture which is defined by an inwardly projecting sleeve 77, the inner ends 78 of the sleeves being shouldered as shown in the drawing (Figs. 5 and 7) to provide a stepped engagement between the ends of the sleeves. The disks are secured in position with the ends 78 of the sleeves 77 in contact by a plurality of bolts 79 which extend through bosses 80 formed on the inner faces of each of the disks. The bolts 79 are shouldered at 81 adjacent each end and may be fastened in place by any suitable means, as by riveting over the ends of the bolts to clamp the bosses 80 firmly against the shoulders 81, and thus permanently unite the disks. The sleeves 77 when the disks are united form a continuous hub 82, the purpose of which will be pointed out later.

The inner face of each disk 76 is provided with an annular groove 83 which receives a continuous ring 84, thus dividing the space between the disks into a closed inner chamber 85 and an open outer chamber 86. The ring 84 is, of course, assembled with the disks before they are united by the bolts 79. In the chamber 86 the inner wall of each disk is formed with radiating flanges 87. The embodiment here shown has 360 such flanges on each disk so that there is one flange for each degree of circumference. The corresponding flanges 87 of the disks 76 form supports for the plates 53 and the spaces between each pair of flanges constitute plate carrying pockets 88, the ends of the plates resting on the flanges 87 and the inner edges resting against the ring 84. Each disk 76 has, at its outer periphery, a continuous flange 89 which provides a continuous annular recess 90 at each end of each plate 53 in the magazine.

For the purpose of reinforcement the disks 76 are joined to the sleeves 77 by integral angle brace plates 91, and in order to avoid any weakening of the disks by the provision of the grooves 83 in the inner faces, the outer faces of the disks are provided with annular bands 92. Surrounding the central opening defined by the hub 82 and forming a continuation thereof beyond the disks is an integral annular flange 93 which projects beyond an annular band 94 on the outer face of the disk, thus providing an annular recess 95 right angular in cross section. On the outer face of one disk 76, that at the right in Fig. 7, is formed an annular band 96, the outer face of which is in alignment with the outer face of the band 94. On the outer face of the other disk 76, that at the left in Fig. 7, is formed a boss 97, a hole 98 being formed through the boss 97 and through the disk at that point.

The plates 53 are secured in the pockets 88 by a hoop 99 which, as shown particularly in Fig. 7, enters the depression 63 in the outer edge of each plate. This hoop preferably is of rigid material and has an open portion 100 which may be closed by a hinged section 101. The hoop engages the plates 53 loosely and relative movement therebetween is provided as will be pointed out hereinbelow. Within the drum 75 may be mounted a certain number of plates 53 selected in accordance with the requirements determined by the use for which this invention is employed. In the construction here shown 360 such plates can be inserted. In order to ensure the proper operation of this machine the plates are arranged according to any desired scheme as for example alphabetically, chronologically, or in any arbitrarily desired order. Certain only of the plates will be required in any particular run of work, and the object of the selector mechanism to be described next is the selection and withdrawal from the group of plates in the magazine 75 of those plates which will be required in the particular instance.

The selector mechanism comprises briefly a support for the magazine 75 from which the plates 53 are to be selected, means for shifting said magazine from time to time in a predetermined direction and means for extracting from the magazine only those plates which are required.

The magazine 75 is removably mounted upon an annular hub 125 which is rigidly secured to and projects outwardly from one face of a ratchet wheel 126. The wheel 126 has a central opening and the hollow of the hub 125 forms a continuation thereof. The hub 125 with the ratchet wheel 126 is mounted upon and rotated relative to a stationary stub shaft 127 which is supported by and projects outwardly from one side of a standard 128, being fixed in the standard 128 in any suitable manner, as by a set screw 129. The hub 125 is held in position upon the shaft 127 by a collar 130 suitably secured upon the shaft as by a pin 131. It will be noted that the hub 125 is of such length that the distance between the inner face of the ratchet wheel 126 and the outer face of the collar 130 is substantially the length of the hub 82 formed by the assembled sleeve 77. The tip of the shaft 127 projecting beyond the collar 130 is provided with an annular recess 132. Projecting outwardly from the ratchet wheel 126 is a pin 133 which, when the wheel and drum are assembled, enters the hole 98, thereby ensuring rotation of the drum and wheel in unison on the stub shaft 127. The drum 75 is held in position upon the hub 125 by means of a gate 135 provided with a latch 136 which enters the notch 132 in the shaft 127 and is held normally in a functioning position by a spring 137. The gate 135 is hingedly supported (see Fig. 5) upon a plate 138 which is secured to the outer face of a block 139.

The ratchet wheel 126 is given an intermittent movement of rotation by a pawl 140 pivotally mounted upon an arm 141 which is supported by the stub shaft 127 between a bushing on the shaft 127 in the standard 128 and the ratchet wheel 126. The pawl 140 normally is held in engagement with the teeth of the rachet wheel 126 by means of a spring 142, one end of which is secured at 143 to the pawl while the other end is attached to a projection 144 from the arm 141. The arm 141 is reciprocated by a rod 145 through mechanism which will be described later in connection with another feature of this construction. The movement of the arm 141 to the left (see Fig. 6) is limited by an adjustable stop 146 which includes a bolt 147, the end of which strikes against a beveled portion 148 of the pawl 140 and thus not only prevents any further movement of the arm 141 to the left but also forces the nose 149 of the pawl into proper engagement with the teeth 150. A supplemental locking device for the ratchet 126 comprises a pawl 154 which is pivotally secured to the standard 128. The nose 155 of the pawl 154 is forced into engagement with the teeth of the ratchet wheel 126 by means of a spring 156, one end of which is attached to the pawl 154 while the other end is attached to the standard 128.

When the drum 75 is slipped into position upon the hub 125, not only is the pin 133 introduced into the opening 98 but the hoop 99 is held against movement by means of a tongue 157 which projects from a bracket 158 at the base of the standard 128 and which enters a loop 159 in the hoop 99. The movement of the drum and ratchet 126 thus is provided for but the hoop 115 is held stationary. As previously pointed out, the contact between the hoop 99 and the plates 53 is such that the plates are free to move relative to the hoop. When the parts are assembled and the hoop 99 is secured in position, the open portion 100 is located as shown in Fig. 6 at one side of the magazine 75 and the hinged section 101 is swung upwardly out of the way and secured in any suitable manner to permit the operation of the extractors or grippers 160. As here shown there are ten grippers in a set, and the length of the section 101 is such that when it is raised, a group of ten plates is exposed to the operation of the grippers.

Each gripper 160 (see Figs. 9, 12 and 13) comprises a pair of fingers 161, each finger 161 being pivoted upon a pin 162 and being held in contact with a rigid stop 163 by springs 164. From each finger 161 extends inwardly an integral strip 165 having a slot 166 in its inner end. The slotted ends of these plates overlap, as shown in Fig. 10, and an armature 167 is secured to the strips by a pin 168 which extends through the slots 166. The inner ends of the gripper fingers 161 enter slots 169 in a carriage 170 which thus separate the gripper fingers from each other and ensure their proper relative location under all conditions. The pins 162 on which the fingers 161 are pivoted preferably extend through all the slots 169 so that all the fingers on one side are pivoted on the same pin.

The carriage 170 is provided with a top 171, a base 172 and side walls 173. The stops 163 previously mentioned form a part of the front wall of the carriage 170 and the slots are in the side walls 173. The side walls are cut away at their rear edges and reinforced by straps 174. Suitably supported within the carriage 170 are a plurality of magnets 175, the poles of which magnets extend to the outer face of the front wall through openings therein adjacent the armatures 167. The magnets are positioned on a rod 176 fixed to the top and bottom of the housing and passing through the loops of the magnets. The strips 165 are offset as shown in Fig. 8 in order to provide sufficient space for the armatures 167 and magnets 175.

The side edges of the base 172 are downwardly and outwardly formed to engage the inner edges of gibs 178 removably secured to the top of the block 139 which is provided in its upper wall with a slot 181 through which a forked bracket 182 projects downwardly from the base 172. The carriage 170 is caused to reciprocate within the gibs 178 by means of an arm 183 rigidly secured to a shaft 184 which extends through the walls 185 of the block 139. The inner faces of the walls 185 are provided with bosses 186 through which the shaft 184 extends and in which it rotates freely. The arm 183 is enlarged at its lower end so that it will fit between the ends of the bosses 186 without permitting an excessive amount of lateral movement and is secured to the shaft 184 by a set screw 187.

The upper end of the arm 183 is connected to the bracket 182 by a bar 188 pivotally secured at the ends to the bracket and arm. The arm 183 is reciprocated by means of a box cam 190, having a path 191 which receives a roller 192, carried by the arm 183 intermediate its ends. The path 191 preferably is divided into arcuate portions 193, 194, a dwell 195, and a dwell 196. In Fig. 6 of the drawings the limits of these portions of the cam path 191 are defined by dotted lines. The cam 190 is mounted upon a main drive shaft 200 which is supported in bosses 201, 202 of the wall 185 and which through gears 203 and 204 drives a shaft 205. The shaft 184 extends beyond the outer face of one of the side walls 185 and receives an arm 206 having a collar 207 integral therewith and by which the arm 206 is fixed to rotate with the shaft 184. The upper end of the arm 206 is pivotally connected to the rod 145 mentioned above. The shaft 205 is supported in brackets 208 projecting from the plate 138.

From a consideration of the mechanism just described it is obvious that the main drive shaft 200 by its rotation causes the intermittent movement of the ratchet wheel 126 and the drum 75 and the intermittent movement of the carriage 170. The cam path 191, however, is so formed that the carriage 170 carrying the grippers 160 advances as the drum is rotated but is retracted while the drum is held in place by the locking pawl 154. The advance and retraction of the carriage 170 is for the purpose of selecting and extracting from the group of ten plates exposed by the hinged section 101 those of that group with which it is desired to print.

Between the block 139 and the standard 129 is located a hopper 210 into which the plates extracted by the grippers 160 are dropped when the grippers are opened. In order to insure an even stacking of the plates, intermediate gates 211 are provided, which reciprocate at predetermined intervals and which first receive the plates dropped from the grippers and later release them, allowing them to drop into the hopper. The gates 211 are pivotally mounted at 212 upon the gibs 178 carried by the block 139 and normally, through the action of springs 213, project into the hopper through slots 214 in the end walls thereof. The retraction of the gates from this normal position is automatically controlled in time with the movement of the gripper carriage 170 by means of bosses 215 which normally project into the path of travel of the carriage. Thus the carriage, when it reaches nearly the limit of its advance, contacts with the bosses 215, causing the gates to separate and allowing any plates that may be supported upon the gates to drop into the hopper. As soon as the carriage starts to retract the bosses 215 are released and the gates returned to their normal position ready to receive the plates extracted by the grippers from the magazine and released in the manner hereinafter pointed out.

Figure 12:
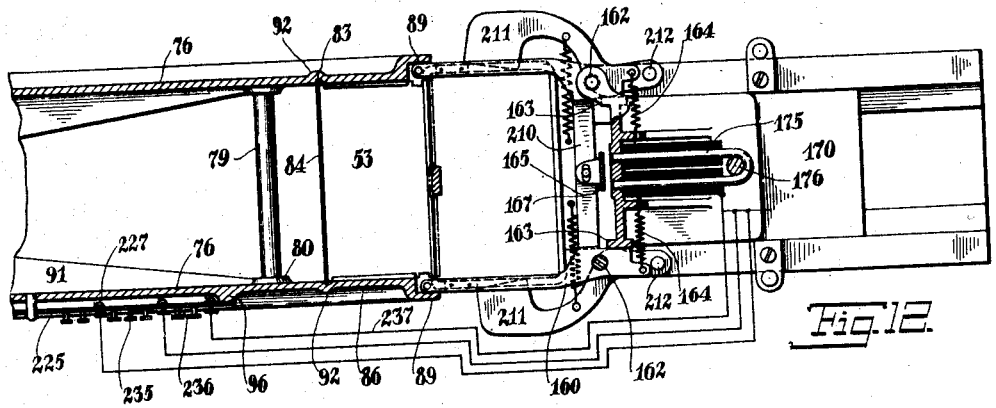
Figure 13:
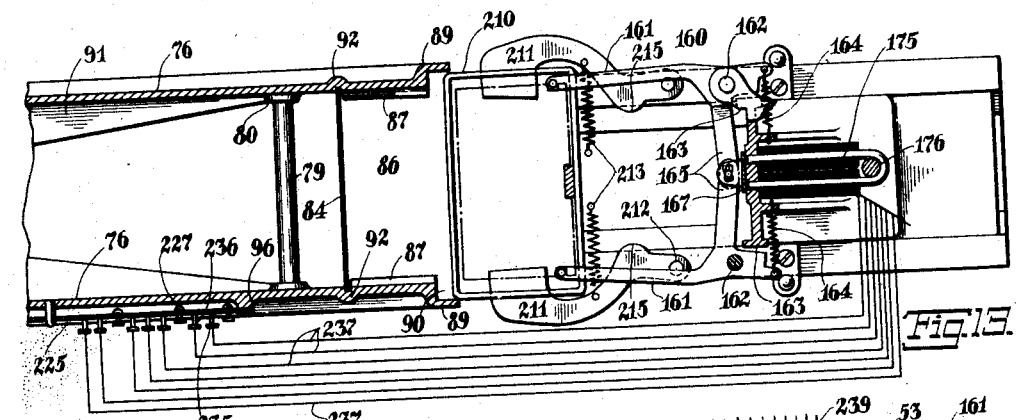

The gripper fingers 161 are each provided at the outer end as shown in Fig. 9 with a pair of plates 220 connected at the tips by a post 221 which is riveted to both the plates. The distance between the plates 220 of each finger is substantially that of the thickness of the plate. Referring to Fig. 12 it will be noted that when the carriage 170 is first advanced the tips of the gripper fingers enter the annular recess 90 out of contact with the plates 53. Obviously, however, if any of the magnets 175 are energized, the armatures 167 controlled by such magnets will be drawn into conjunction therewith, thus causing the gripper fingers 161 to turn on the pivot pins 162 against the action of the springs 164 and carry the posts 221 into the notches 62 (see Fig. 13). The plates 53 thus will be engaged by the gripper fingers 161, and when the carriage 170 is caused to retreat under the movement of the cam 190, those plates which are engaged by gripper fingers will be removed from the magazine and held over the hopper 210 by the fingers 161. Due to the fact that the outer corners of the plates are supported by the plates 220, as pointed out above, these plates will remain in substantially a horizontal position until released and allowed to drop onto the gates 211.

The mechanism for operating the gripper fingers includes an annular master plate 225 which preferably is of brass or other ductile material which is removably secured to the outer face of the right-hand disk 76 as appears in Fig. 7. The band 96 preferably is so located as to receive the outer periphery of the master plate while its inner periphery rests in the recess 95. The master plate may be secured in place in any desired manner and is provided with a number of series of slots 226, each slot being arcuate or irregular to form an integral finger 227 (see Figs. 15a, 15b and 15c). The slots 226 are arranged in rows of ten slots each, which rows extend inwardly from the outer periphery of the master plate in an arc. The number of rows of slots is thus one-tenth of the number of the pockets 88 formed by the flanges 87, and in the present instance, therefore, there will be thirty-six such rows. The curve defined by the slots is determined by circles 228 and radii 229 (see Fig. 15a). The circles 228 are concentric and equally spaced and each includes one of the slots 226 in each row. Thus the outer circle includes the first slot in each row, the second circle includes the second slot in each row, etc. and the various slots in each row are spaced a predetermined distance apart. The radii 229 in the present instance are one degree apart and each includes one slot so that the position of each slot is determined by a circle 228 and a radius 229, the corresponding slots in each row being ten degrees apart. The fingers 227 constitute factors by which the action of the grippers 160 is controlled.

The gate 135 previously referred to is recessed to provide a chamber 230 through which extends a shaft 231 mounted in the walls of the chamber 230. Fixed to the shaft 231 are a pair of uprights 232 which are notched at their upper ends to receive a bar 233 of dielectric material. The ends of the bar 233 are secured in the notches by pins 234 or by any equivalent means. Mounted upon the bar 233 are a plurality of pairs of flexible strips 235, ten such strips being here provided. These strips preferably are of brass or other current conducting material and carry at their outer end studs 236 which are arranged in relation to each other along a curve which corresponds to the curve of the slots 226 just described. The lower end of each strip 235 is separately and electrically connected by a lead 237 to a corresponding magnet 175 of the gripper mechanism from which magnet leads 238 extend to a suitable source of electric current 239, the other side of which source is connected to the master plate 225 either directly or through a ground. The voltage applied is approximately ten volts, and it has been found entirely feasible to connect one side of the source of current to the pedestal 128.

Thus, when the studs 236 contact with the fingers 227 or control factors of the master plate, impulses are transmitted to the gripper magnets 175 which cause the gripper fingers to engage certain plates. The fingers 227 defined by the slots 226 may be depressed as indicated in the drawings, leaving apertures 240 in the plate 225. These apertures 240 are of such dimension that the studs 236 which enter them will not contact with the plate. Consequently the magnets 175 connected to such studs will not be energized and the grippers controlled thereby will not function. As shown diagrammatically in Fig. 14 the fingers 227 in the first, fourth and eighth slots 226 are depressed while the fingers in the other slots are in alignment with the surface of the master plate so that the first, fourth and eighth grippers are inoperative while the other grippers grasp the plates 53 to which they are adjacent and extract them from the magazine when the carriage 170 is retracted.

The studs 236 are advanced toward and withdrawn from the master plate 225 by the oscillation of the shaft 231 through an arm 250 carried by one end of the shaft which projects through the wall of the chamber 230 in alignment with the hinges which support the gate 135. The arm 250 is provided with a roller 251 which rests upon and is actuated by a cam 252 mounted upon the shaft 205. The gate 135 is mounted upon the plate 138 by hinges 253 including pins 254. When the gate 135 is swung out of the closed position (see the dotted line position Fig. 5) the roller 251 is simply carried away from the cam 252 by the movement of the gate, and when the gate is closed, the roller is again carried back into engagement with the cam 252.

The master plate 225 is positioned on the drum 75 by a pin 260 which enters a hole 261 in the plate so that the master plate can be located on the drum only in the position in which the hole 261 registers with the pin 260. The plate 225 is held on the drum by rollers 262 which rotate freely on the latch 136 and by a series of rollers 263 supported in a bracket 264 on the gate 135.

In place of the master plate 225 which controls the operation of the grippers 160 by factors comprising the fingers 227 in the slots 226 the means shown in Fig. 27 may be employed. An imperforate plate 270 of brass or other suitable material is substituted for the plate 225 and may if desired be permanently secured to the side disk 76 of the drum. Removably mounted on the plate 270 in a predetermined position is a master disk 271 of paper, fiber or other dielectric material. In the master disk 271 are formed perforations 272 which are arranged in rows in the manner previously described with reference to the slots 226. The rows of perforations are not complete however, certain perforations being omitted. The plate 270 is connected to the source of current 239 in the same way as was the master plate 225 and hence when a stud 236 contacts with the plate 270 passing through a perforation 272 its gripper is caused to act. If, however, there is no perforation 272 in the master disk 271 the stud 236 strikes the disk and accordingly its gripper is not actuated. The perforations 272 thus function as control factors like the fingers 227. The first stud 236 strikes the disk 271 and hence its gripper is not actuated while the second stud 236 passes through a perforation 272 into contact with the plate 270 and its gripper is energized.

It will be noted that all the moving parts are actuated by the drive shaft 200 and that the arm 206 and the cams 190 and 252 are so formed and located that the parts move in the following sequence. The magazine 75 is rotated by the arm 206 and at the same time the gripper carriage is advanced by the roller 192 traveling along the portion 193 of the cam. The tips of the gripper fingers 161 enter the recesses 90 so that they do not interfere with the movement of the magazine if they enter while it is still in motion. The carriage 170 is stationary as the roller 192 travels along the dwell portion 196, and the magazine is also held against rotation by the locking pawl 154. At this period the cam 252 oscillates the shaft 231, energizing the magnets 175 by the means previously described. The roller 192 now travels along the portion 194 retracting the carriage 170 and removing the selected plates. When the roller 192 enters the dwell portion 195 the cam 252 swings the strips 235 away from the master plate de-energizing the magnets and allowing the plates 53 to drop onto the gates 211. During the return of the carriage the arm 206 retracts the rod in preparation for the next rotation of the magazine.

The plates 53 are fed from the hopper 210 by the feeding means 55 to the printing mechanism 51 and thence to a vertical hopper 300 in which the plates are stacked one upon another in accordance with the usual practice. This hopper 300 is in front of the filing mechanism by which the plates are now to be returned to the pockets 88 in the magazine 75 from which they were taken.

One means of insuring that the plates are level in the hopper 300 is shown particularly in Fig. 25. The mouth of the hopper is normally closed by means of gates 275 which project into the hopper through slots 276 in the end walls thereof similar to the gates 211 previously described. The gates 275 which are pivotally supported at 277 on brackets 278 depending from the table are substantially right angular in conformation. The inner ends of the gates overlap and are provided with longitudinally extending slots 280 through which slots the tip of an arm 281 extends. The arm 281 is mounted upon a rock shaft 282 suitably supported by the magazine 300. The rock shaft 282 is operated by an arm 283 having at its outer end a roller 284 controlled by a cam 285 actuated by a shaft 286 suitably rotated by means to be described later. The cam 285 is given one complete rotation for each reciprocation of the ejector mechanism 315.

The magazine 75, with its master plate 225, has meanwhile been removed from the hub 125 and placed upon a hub 301 which is secured to a gear plate 302. The hub 301 and plate 302 are mounted upon a stationary shaft 303 projecting outwardly from a bracket 304 which depends from the table 54 on which the selector mechanism 50 and the printing mechanism are supported. The shaft 303 is held against rotation by means of a set screw 305, and the hub 301 is secured on the shaft by means of a collar 306 pinned to the shaft and corresponding to the collar 130. The end of the shaft 303 projecting beyond the collar 306 is provided with an annular notch 308. The magazine is caused to rotate with the gear 302 by means of a pin 309 which enters the aperture 98 in the magazine. The magazine is held on the hub 301 by means of a gate 310 provided with a latch 311 which enters the notch 308 in the shaft 303 and is held therein by a spring 312. This gate 310 and latch 311 are substantially the same in operation as are the gate 135 and latch 136 previously described and carry rollers 313 and 314 which bear against the master plate to hold it on the drum 75 in the same manner as did the rollers 262 and 263 of the selector mechanism.

The plates 53 are moved from the hopper 300 by means of an ejector mechanism 315 which consists of a pair of flanged plates 316 connected at each end by crossbars 317 and connected at the top by a bar 318. The flanges 319 of the plates 316 ride in guideways 320 formed by recessed gibs 321 which are secured by screws 322 to a housing 323 suitably secured to the under side of the table preferably by means of bolts or other devices passed through flanges 324. The housing 323 is provided with a pair of parallel inturned flanges 325 to which the gibs 321 are secured, suitable plates 326 being inserted between the flanges and the gibs for a reason to be pointed out later. Depending from the crossbar 318 are a pair of brackets 330 carrying a rod 331 on which is supported one end of a bar 332. The other end of the bar 332 enters the forked lower end of a lever 333 and is pivotally secured thereto by a stud 334. The lever 333 is secured to a cross shaft 335 which is supported in bosses 336 which project inwardly from the sides of the housing 323. One end 337 of the shaft 335 extends beyond the wall of the housing for a reason to be pointed out later.

Rigidly mounted on a shaft 340 supported by the walls of the housing 323 is a cam 341 having a closed path 342 which receives a roller 343 carried by the arm 333 substantially midway between its ends. The cam 341 preferably is a duplicate of the cam 190 and the path 342 is the same as the path 191. The shaft 340 is driven by any suitable means, preferably that which drives the shaft 200, and as it rotates the cam 341 it obviously reciprocates the plates 316 and the crossbar 318 through the arm 333 and the connections previously described.

The gear 302 is rotated by the shaft 340 through the lever 333 and shaft 335 by means of an arm 350 which is fixed to the projecting end 337 of the shaft. The arm 350 is connected by a rod 351 to an arm 352 pivoted upon a shaft 353 mounted to rotate in the bracket 304. The rod 351 has suitable adjustable connections 354 with the arms 350 and 352. Pivotally mounted on the arm 352 is a pawl 355, the nose 356 of which engages teeth 357 on an intermittent gear wheel 358 which is pinned to the shaft 353. The movement of the pawl 355 is controlled by an adjustable stop 360 to limit its movement in one direction. A spring 361 secured at its ends to the pawl 355 and the arm 352 yieldingly holds the nose 356 in engagement with the gear teeth 367. The shaft 353 is provided at its inner end with a gear 365 suitably pinned thereto and having teeth 366 which mesh with teeth 367 on the gear 302. A locking pawl 368 functions in conjunction to hold the gear 358 in its proper position. This pawl has a nose 369 which is held in engagement with the teeth 367 of the gear 363 by means of a spring 370, the ends of which are suitably anchored. The action of the pawls 355 and 368 is equivalent to the action of the pawls 140 and 154 previously described. By reason of the construction thus set forth the oscillation of the shaft 355 by means of the cam 341 causes the advance of the gear 358 a single step and consequently through the gear 365 advances the gear 302 one step. While during the operation of the selector mechanism the drum 75 was rotated ten spaces at each movement, it is necessary when filing the plates that the drum move only one space at a time. In other words, the number of teeth on the various gears described are such that the drum will be moved only one degree at each operation of the gearing.

The reciprocation of the ejector mechanism 315 by the lever 333 and cam 341 thus described is in a plane below that of the lowest plate 53 in the hopper 300 which rests upon the parallel bars 326 which also support the walls of the hopper 300; and hence this movement of the ejector mechanism which takes place at each rotation of the shaft 340 will have no effect upon the plate. Pivotally mounted on a rod 375 carried by the plates 316 are a pair of arms 376 connected at their outer ends by a crosspiece 377. The arms 376 are preferably formed as shown in the drawings, the ends opposite to those carrying the crosspiece 377 being brought into substantial proximity with one another and connected by a block 378. The crosspiece 377 normally rests upon the crossbar 318 and is held in that position by means of a spring 379 anchored at one end 380 to one of the cross members 317 and at the other end to a tongue 381 on the block 378. The movement of the block 378 is controlled by a magnet 385 carried by the plates 316 which is similar in construction to the magnets 175 previously described. The block 378 functions as an armature so that when the magnet is energized it is drawn against the ends of the magnet and the crosspiece 377 is raised so that upon the next reciprocation of the ejector mechanism the lowest printing plate 53 is removed from the hopper 300 and inserted in the empty pocket 88 in the drum 75 in which it belongs.

In order to ensure the proper location of the plate 53 and to avoid any attempt to insert a plate in a pocket which has already been filled, the gate 310 is equipped with a plurality of strips 390, each of which is provided with a stud 391 which coacts with the slots 226 on the master plate 225. The strips 390 are similar in construction and operation to the strips 235 and are enclosed in a chamber 392 of the gate 310. The studs 391 on the strips 390 are located along one of the radii of the disk 225 and since the slots 226 on the disk are located in curved rows, it is obvious that at each location only one of the studs 391 can be in engagement with one of the fingers 277 or can enter an aperture 240 of the finger 277 which is depressed. Thus the master plate 225 controls the filing of the plates as well as the selecting thereof.

The strips 390 are advanced and retracted from the disk 225 by mechanism very similar to that which actuates the strips 235. The strips are carried upon a bar 400 of dielectric material supported at each end upon arms 401 secured to a shaft 402 which is mounted to rotate in the gate 310 and which projects at one end from the gate. A suitable coil spring 403 normally holds the strips 390 and studs 391 out of any possible contact with the fingers 278 of the disk 225. The gate 310 is hinged upon a plate 405 which is carried by and secured to the lower end of the housing 323. The projecting end of the shaft 402 carries an arm 406 which, when the gate is closed, is directly above and rests upon a roller 407 carried by an arm 408 which is pivotally supported on a shaft 409 carried by the housing 405. The shaft 409 extends beyond the housing 405 and is provided with an arm 410 to which is pivotally secured a rod 411 having a suitable adjustable connection 412. Pivotally supported on a stud 415 carried by the housing 323 is an arm 416 to which the upper end of the rod 411 is secured by suitable adjustable connections 417. Projecting at right angles to the arm 416 is a pin 418 carrying a roller 419 which is in engagement with a cam 420 on the shaft 340. By reason of the weight of the connections described the arm 416 tends to swing anti-clockwise, as shown in Fig. 18 and accordingly a spring plate 421 is provided which will hold the roller 419 at all times in contact with the cam 420.

By the construction just described the cam 420 upon each revolution of the shaft 340 will cause all the strips 390 to advance toward and retract from the master plate 225. The strips 390 are so positioned relative to the master plate 225 that each stud 391 will cooperate with one of the slots 226 in one of the circles 228. Thus the stud 391 on the strip 390 at the right in Fig. 22 coacts with the slots 226 in the outer or first circle, which slots are for convenience referred to as the first slots and in the same way the stud 391 on the strip 390 at the left in Fig. 22 will cooperate with the tenth slot 226 in each row.

By an electrical connection, which will be set forth in detail below, the condition of the slot 226 controls the energizing of the magnet 385 so that when the pocket 88 of the drum 75 which is in alignment with the plate 53 at the bottom of the hopper 300 is empty, the plate will be inserted therein upon the reciprocation of the ejector mechanism. On the other hand, when that pocket 88 is filled, the ejector mechanism will function idly.

As previously pointed out, the master plate 225 is prepared for each run of the magazine by depressing the fingers 227 of the slots which correspond to the pockets 88 from which no plate is to be removed. The depression of the finger 227 leaves an aperture 240 into which a stud 391 may enter without coming into contact with the metal of the master plate. The electrical connection between the strips 390 and the magnet 385 must include a commutator factor of some type, because upon each oscillation of the bar 400 by the cam 420 all the strips are advanced to the master plate and each of the studs 391 will contact with that plate unless an aperture 240 in the master plate is at that time located below one of the studs. Obviously, therefore, unless such a factor were provided, the magnet 385 would be energized upon each oscillation of the bar 400.

The purpose of the factor is to break the circuit between all but one of the strips 390 and the magnet so that at each oscillation of the bar 400 the contact or failure to contact by one stud only with the master plate will control the magnet 385. Each strip 390 is connected by a lead 430 with one of the brushes 431 which constitute a part of the commutator factor. The brushes 431 are mounted in a row upon a block 432 of any dielectric material which is supported from the top of the housing 323 (see Figs. 20 and 24).

Mounted to rotate on a rod 433 carried by the walls of the housing 323 is a cylinder 434 from which project a plurality of contact buttons 435. As shown in the drawings there are ten of these buttons located spirally around the cylinder 434, and each button is in alignment with one only of the brushes 431. The cylinder 434 is rotated from the shaft 335 which is, as previously pointed out, oscillated by the cam 341 through the lever 333. Mounted on the shaft 335 is an arm 436 to which is connected a link 437 pivotally secured at its upper end to an arm 438 mounted to oscillate on the rod 433 at the right of the cylinder 434, as shown in Fig. 20. Secured at that end of the cylinder 434 is a gear 440 with which a pawl 441 pivotally mounted at 442 on the link 437 engages. Thus each oscillation of the shaft 335 causes the link 437 to reciprocate, moving the cylinder 434 one step by the engagement of the pawl 441 with the teeth of the gear 440.

Resting upon the surface 443 of the cylinder 434, which is of copper or other suitable current-carrying material over a center 444 of dielectric material, is a roller 445 carried by an arm 446 pivotally mounted on a stud 447 carried by one wall of the housing 323. A suitable spring 448 is provided to hold the roller 445 at all times in contact with the surface 443 of the cylinder 434. It will further be noted that the buttons 435 are so located that they will not at any time come in contact with the roller 445.

The arm 446 is connected by a lead 449 with one pole of the magnet 385. The other pole is connected to a battery or other source of current 450 by a lead 451. The battery 450 is connected either directly or through the ground with the master plate 225. Consequently in the position shown diagrammatically in Fig. 26, it may be assumed that the stud 391 of the first or right-hand strip 390 is located over a slot 226 in the plate 225 in which slot the finger 227 is in the plane of the master plate. The bar 400, being oscillated, carries the strips 390 against the surface of the master plate, the stud at the right contacting with the finger 227. Each other stud 391 contacts with the plate 225, but owing to the position of the commutator cylinder 434, there is no electrical connection between any of the strips 390 and the magnet 385 except through the first strip. Since, as pointed out, this stud contacts with a finger 227 the magnet 385 will be energized, thus causing the crosspiece 377 to be raised as the ejector mechanism is actuated, to remove the plate 53 at the bottom of the hopper 300 and insert it in the empty pocket 88 whose condition is indicated by the position of the finger 227.

It will be noted that the movements of the various parts of the filing mechanism are controlled by the rotation of the shaft 340 and are so arranged that they work in absolute unison; thus the drum 75 is first rotated one step by the lever 335 and the cam 341 and at the same time, by the link 437, the cylinder 434 is also rotated to remove one stud 435 from contact with a brush 431 and to move the next succeeding stud into contact with the adjacent brush. After these movements have been completed, the bar 400 is caused to oscillate by the cam 420, thus bringing the studs 391 into contact with the surface of the master plate 225. One of the studs 391 will engage with the slot 226 which corresponds to the pocket 88 in the magazine which is in alignment with the bottom plate 53 in the hopper 300. The position of the finger 227 in that slot controls through the cylinder 434 the energizing of the magnet 385. When the pocket 88 in alignment with the hopper is empty, the magnet will be energized and the crosspiece 377 raised. Upon the other hand, when the pocket 88 is full, the finger 227 will have been depressed so that the stud 391 will enter the aperture 240 and the magnet 385 will not be energized. Following the oscillation of the bar 400 and the consequent action with reference to the magnet 385, the ejector mechanism 315 is caused to advance by the cam 341 and at the same time the pawl 355 which controls the position of the magazine 75 is retracted, and the pawl 441 which controls the cylinder 434 is also retracted. The ejector mechanism as it advances from the position shown in Fig. 18 into the position shown in Fig. 22 will either insert the plate 53 at the bottom of the hopper into the empty pocket 88 or will function idly, depending upon the position of the crosspiece 377.

Figure 1:
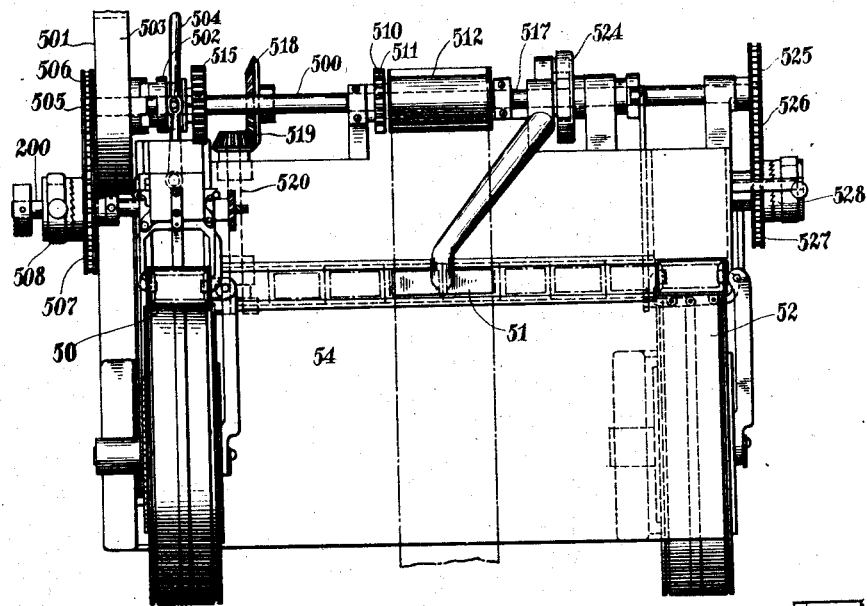
Figs. 1 and 2 are plan and elevational views of the entire selected assembly.
Figure 2:
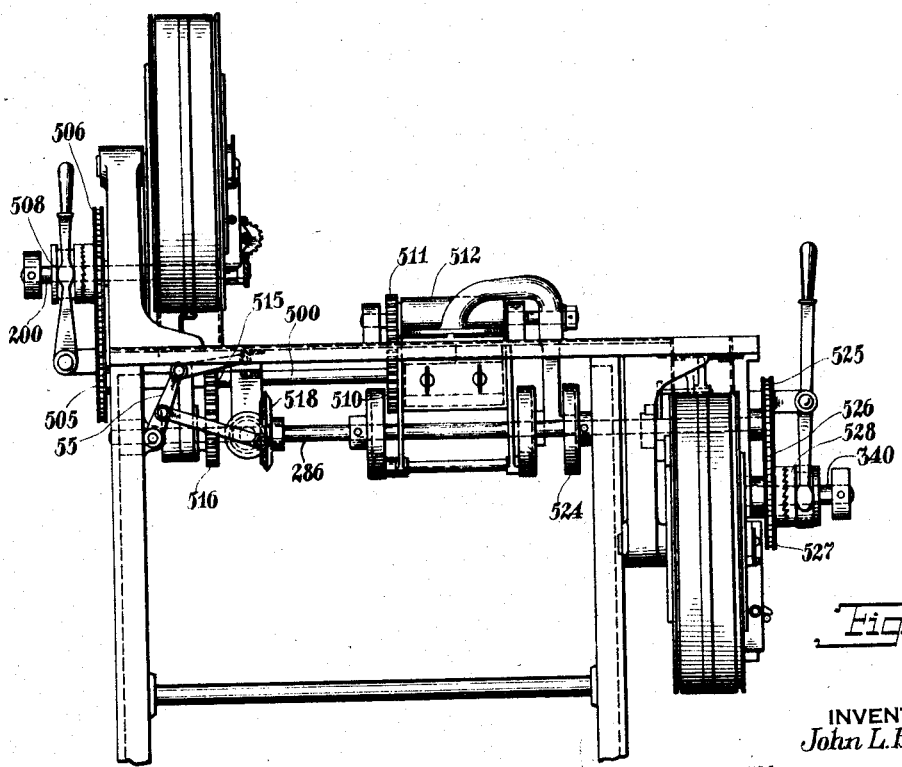

In order to insure a proper coordination of operation of the various mechanisms hereinabove described, it is desired that all the various elements be actuated from a single source of power. This, as shown for example in Fig. 1, may be a shaft 500 suitably supported and driven by a pulley 501 through a clutch 502. The pulley 501 may be actuated by a belt 503 from any suitable source of energy. The clutch 502 is controlled by a lever 504 and may be of any desired construction.

At one end of the shaft 500 is secured a sprocket wheel 505 which, through a chain 506, drives a sprocket wheel 507 which rotates the shaft 200 through a suitable clutch mechanism 508. At the other end of the shaft 500 is mounted a gear 510 which intermeshes with a gear 511 and actuates the rolls 512 by which the paper to be printed upon is fed. Fixed on the shaft 500 intermediate its length is a gear 515 which meshes with a gear 516 carried by the shaft 286 by which the other mechanisms are driven. A bevel gear 518 on the shaft 286 meshes with a similar gear 519 on a shaft 520 which actuates the plate feeding means 55. The printing machine which is here shown of the well-known addressing type is operated in the well-known manner by means of the cam 524. At the outer end of the shaft 286 is mounted a sprocket 525 which by a chain 526 drives a sprocket 527 which in turn rotates the shaft 340 through a suitable clutch mechanism 528.

The operation of the machine embodying the invention will now be described briefly. The master plate 225 is preferably of distortable material and may be furnished with the fingers 227 either in or out of the plane of the plate. In preparing the plate for the run those fingers which control the pockets 88 of the magazine 75 in which are carried the plates not needed in this operation of the machine are pushed through the slots 226 while the other fingers fill the slots. The master plate 225 is mounted upon the magazine and the machine operated in the way described, the grippers 160 selecting and removing from the magazine the plates from the pockets 88 indicated by the master plate. The removed plates are dropped onto the gates 211 and later dropped into the hopper 210 from which they are carried along the table 54 by the feeding means 55 to the printing mechanism 51 and then to the gates 275 and the hopper 300 in which they are stacked.

When the selecting cycle is completed, the magazine 75 with master plate thereon may be taken off the hub 125 and mounted upon the hub 301. After the printing operation has been finished the filing mechanism is started and the plates in the hopper 300 are replaced one at a time into the pockets 88 from which they had been removed. The master plate 225 controls the refiling so that when all the plates have been taken from the hopper the magazine has been restored to its original condition. The next run of the machine may require certain different printing plates and under such circumstances a new master plate may be applied which complies with the new conditions or the control factors on the plate just used may be altered if desired.

Whenever it is desired to repeat the printing operation the refiling operation is omitted and all the plates are transferred directly from the hopper 300 to the hopper 210 and again passed through the machine.

If instead of the master plate 225 the plate 270 and master disk 271 were employed, the operation will be the same, the perforations 272 in the disk functioning in the same manner as the fingers 227 in the slots 226. With this form of master control a number of disks 271 having different arrangements of perforations are prepared and the disk having the proper arrangement is applied to the imperforate plate 270.

While one application of this invention has been shown and described and certain structural details have been set forth, the invention is not limited thereto since other applications and other details can be made without departing from the spirit and scope of the invention as set forth in the annexed claims.

I claim:

1. The combination with a magazine containing a group of articles of means for selecting and removing certain articles from the group in the magazine and means for refiling the removed articles in the magazine, each said means including an electromechanical actuator, and a common control for both said means.

2. The combination with a magazine containing a group of articles of means for selecting and removing certain articles from the group in the magazine and means for refiling the removed articles in the magazine in the positions from which they were removed, each said means including an electromechanical actuator, and a common control for both said means.

3. The combination with a magazine containing a group of articles of means for selecting and removing certain articles from the group in the magazine and means for refiling the removed articles in the magazine, each said means including an electromechanical actuator, and a control mounted on the magazine for both said means.

4. The combination with a movable magazine provided with a plurality of pockets which contain articles, means for selecting and removing articles from certain predetermined pockets in the magazine, means for restoring the articles to the pockets from which they were removed by the first named means, each of said means including an actuator, and a common control having factors for controlling said actuators.

5. The combination with a movable magazine provided with a plurality of pockets which contain articles, means for selecting and removing articles from certain predetermined pockets in the magazine, means for restoring the articles to the pockets from which they were removed by the first named means, each of said means including an actuator, and a common control carried by said magazine having factors for controlling said actuators.

6. The combination with a movable magazine provided with a plurality of pockets which contain articles, means for selecting and removing articles from certain predetermined pockets in the magazine, means for restoring the articles to the pockets from which they were removed by the first named means, each of said means including an actuator, and a common control having factors for controlling said actuators, the first named means being operable to remove more than one article at a time at each operation and the second named means being operable to restore one article only at a time.

7. The combination with a movable magazine provided with a plurality of pockets which contain articles, means for selecting and removing articles from certain predetermined pockets in the magazine, means for restoring the articles to the pockets from which they were removed by the first named means, each of said means including an actuator, and a common control carried by said magazine having factors for controlling said actuators, the first named means being operable to remove more than one article at a time at each operation and the second named means being operable to restore one article only at a time.

8. The combination with a movable magazine provided with a plurality of pockets which contain articles, of means for selecting and removing articles from certain predetermined pockets in the magazine, and means for restoring the articles to the pockets from which they were removed by the first means, control factors on said plate and actuators for each means controlled by such factors, the first means removing articles from one or more pockets at each operation and the second means restoring one article only at a time.

9. The combination with a movable magazine provided with a plurality of pockets which contain articles, of a plate carried by said magazine, means for selecting and removing articles from certain predetermined pockets in the magazine, and means for restoring the articles to the pockets from which they were removed by the first means, control factors on said plate and actuators for each means controlled by such factors, the first means removing articles from one or more pockets at each operation and the second means restoring one article only at a time.

10. The combination with a movable magazine provided with a plurality of pockets which contain articles, of means for selecting and removing articles from certain predetermined pockets in the magazine, and means for restoring the articles to the pockets from which they were removed by the first means, control factors, actuators for each means controlled by such factors, and means for moving the magazine intermittently, the operation of said selecting and removing and restoring means taking place when the magazine is at rest.

11. The combination with a movable magazine provided with a plurality of pockets which contain articles, of means for selecting and removing articles from certain predetermined pockets in the magazine, and means for restoring the articles to the pockets from which they were removed by the first means, control factors on said plate, actuators for each means controlled by such factors, and means for moving the magazine intermittently, the operation of said selecting and removing and restoring means taking place when the magazine is at rest.

12. The combination with a movable magazine provided with a plurality of pockets which contain articles, of a plate carried by said magazine, means for selecting and removing articles from certain predetermined pockets in the magazine, and means for restoring the articles to the pockets from which they were removed by the first means, control factors on said plate, actuators for each means controlled by such factors, and means for moving the magazine intermittently, the operation of said selecting and removing and restoring means taking place when the magazine is at rest.

13. The combination with a movable magazine provided with a plurality of pockets which contain articles, of means for selecting and removing articles from certain predetermined pockets in the magazine, and means for restoring the articles to the pockets from which they were removed by the first means, control factors, actuators for each means controlled by such factors, which actuators include magnets and connections between the magnets and control factors whereby the energizing of the magnets is controlled by the factors.

14. The combination with a magazine provided with a plurality of pockets which contain articles occupying predetermined positions with respect to one another, of means for selecting and removing simultaneously articles from certain predetermined pockets in the magazine, means for restoring the articles one at a time to the pockets from which they were removed by the first named means, and a common control for both of said means.

15. The combination with a movable magazine provided with a plurality of pockets which contain articles, of a plate carried by said magazine, means for selecting and removing articles from certain predetermined pockets in the magazine, and means for restoring the articles to the pockets from which they were removed by the first means, control factors on said plate, actuators for each means controlled by such factors, which actuators include magnets and connections between the magnets and control factors whereby the energizing of the magnets is controlled by the factors.

16. The combination with an intermittently movable magazine containing a group of articles occupying predetermined positions with respect to one another, of means for selecting and removing certain articles from the magazine, means for restoring each of the removed articles to the place in the magazine from which it was removed, and a common control for both of said means.

17. The combination with an intermittently movable magazine containing a group of articles occupying predetermined positions with respect to one another, of means for selecting and removing simultaneously certain articles from the magazine, and means for restoring the removed articles one at a time to the places in the magazine from which they were removed.

18. The combination with an intermittently movable magazine containing a group of articles occupying predetermined positions with respect to one another, of means for selecting and removing simultaneously certain articles from the magazine, means for restoring the removed articles one at a time to the places in the magazine from which they were removed, and a common control for both of said means.

19. The combination with a rotatable magazine provided with a plurality of pockets for articles, of a rotatable control member provided with control factors, means for handling articles relative to certain pockets, means for rotating the magazine and control member, means movable toward and from the control factors and connections between said movable means and said article handling means whereby said factors control the operation of the article handling means with regard to the pockets of the magazine.

20. The combination with an intermittently movable magazine provided with a plurality of pockets which contain articles occupying predetermined positions with respect to one another, of means for selecting and removing simultaneously articles from certain predetermined pockets in the magazine, and means for restoring the articles one at a time to the pockets from which they were removed by the first named means.

21. The combination with an intermittently movable magazine provided with a plurality of pockets which contain articles occupying predetermined positions with respect to one another, of means for selecting and removing articles from certain predetermined pockets in the magazine, means for restoring the articles to the pockets from which they were removed by the first named means, and a common control for both of said means.

22. The combination with an intermittently movable magazine provided with a plurality of pockets which contain articles occupying predetermined positions with respect to one another, of means for selecting and removing simultaneously articles from certain predetermined pockets in the magazine, means for restoring the articles one at a time to the pockets from which they were removed by the first named means, and a common control for both of said means.

23. The combination with a rotatable magazine provided with a plurality of pockets for articles, of a rotatable master plate provided with control factors, means for handling articles relative to certain pockets, means for rotating the magazine and master plate, means movable toward and from the control factors and connections between said movable means and said article handling means whereby said factors control the operation of the article handling means with regard to the pockets of the magazine.

24. The combination with a rotatable magazine provided with a plurality of pockets for articles of a control member carried by the magazine and provided with control factors, means for handling articles relative to certain pockets, means for rotating the magazine and member, means movable toward and from the control factors and connections between said movable means and said article handling means whereby said factors control the operation of the article handling means with regard to the pockets of the magazine.

25. The combination with a rotatable magazine provided with a plurality of pockets for articles of a control plate carried by the magazine and provided with control factors, means for handling articles relative to certain pockets, means for rotating the magazine and plate, means movable toward and from the control factors and connections between said movable means and said article handling means whereby said factors control the operation of the article handling means with regard to the pockets of the magazine.

26. The combination with a rotatable magazine provided with a plurality of pockets for articles, of a rotatable control member provided with control factors, means for handling articles relative to certain pockets, means for rotating the magazine and control member, means movable toward and from the control factors and connections between said movable means and said article handling means whereby said factors control the operation of the article handling means relative to the pockets of the magazine, the magazine and control member being intermittently rotatable and the article handling means being operable when the magazine is at rest.

27. The combination with a rotatable magazine provided with a plurality of pockets for articles, of a rotatable master control plate provided with control factors, means for handling articles relative to certain pockets, means for rotating the magazine and master control plate, means movable toward and from the control factors and connections between said movable means and said article handling means whereby said factors control the operation of the article handling means relative to the pockets of the magazine, the magazine and control plate being intermittently rotatable and the article handling means being operable when the magazine is at rest.

28. The combination with a rotatable magazine provided with a plurality of pockets for articles, of a control member carried by the magazine and provided with control factors, means for handling articles relative to certain pockets, means for rotating the magazine and the control member carried thereby, means movable toward and from the control factors, and connections between said movable means and said article handling means whereby said factors control the operation of the article handling means relative to the pockets of the magazine, the magazine and control member carried thereby being intermittently rotatable and the article handling means being operable when the magazine is at rest.

29. The combination with a rotatable magazine provided with a plurality of pockets for articles, of a control plate carried by the magazine and provided with control factors, means for handling articles relative to certain pockets, means for rotating the magazine and the control plate carried thereby, means movable toward and from the control factors, and connections between said movable means and said article handling means whereby said factors control the operation of the article handling means relative to the pockets of the magazine, the magazine and control plate carried thereby being intermittently rotatable and the article handling means being operable when the magazine is at rest.

30. A cylindrical magazine having a plurality of radially arranged pockets open at the periphery of the magazine and adapted to contain plates, each plate having a depression in its outer edge, and a hoop surrounding said magazine and engaging the depression in each plate.

31. The combination with a cylindrical magazine having a plurality of radially arranged pockets open at the periphery of the magazine and adapted to receive plates, of means for rotating said magazine, a hoop surrounding said magazine and having an open portion exposing a plurality of pockets, grippers adapted to enter the open portion of the hoop to a position adjacent the articles in the exposed pockets, means to actuate certain predetermined grippers in such position to engage the articles in certain pockets and means to advance said grippers into the adjacent position and to withdraw said grippers together with the engaged articles thereby removing the articles from the magazine.

32. The combination with a cylindrical magazine having a plurality of radially arranged pockets open at the periphery of the magazine adapted to receive plates, of means for rotating said magazine, a hoop surrounding said magazine and having an open portion exposing a plurality of pockets, grippers adapted to enter the open portion of the hoop to a position adjacent the articles in the exposed pockets, means to actuate certain predetermined grippers in such position to engage the articles in certain pockets, means to advance said grippers into the adjacent position and to withdraw said grippers together with the engaged articles thereby removing the articles from the magazine, and a master plate having factors, the actuating means being controlled by the factors on the master plate which factors may be varied.

33. The combination with a cylindrical rotatably mounted magazine having a plurality of radially arranged pockets open at the periphery, of a hopper in which plates may be stacked, means for rotating said magazine intermittently, one pocket in the magazine being in alignment with the bottom plate in the hopper at each cessation of movement, a plate having control factors for indicating the condition of the pockets, an ejector reciprocating below the bottom plate in the hopper, and means controlled by the factors for causing said ejector to engage and transfer the bottom plate to the aligned pocket when the pocket is empty.

34. In a machine of the class described movable elements, means for operating upon such elements and a master control plate of distortable material provided with a plurality of control factors capable of being repeatedly adjusted into and out of their operative position, whereby the plate is capable of controlling a plurality of selected operations of such means.

35. In a machine of the class described, a hopper, means for moving plates relative to said hopper, gates normally extending into said hopper to support certain plates therein and connections between the plate moving means and the gates for shifting the gates out of their normal position upon each actuation of the moving means.

36. The combination with a movable magazine provided with a plurality of pockets adapted to contain articles, means for removing articles from such pockets, means for restoring the articles to the pockets from which they were removed, actuators for both such means, a movable member provided with control factors which control said actuators and predetermine the pockets containing the articles to be handled by said removing and restoring means and means for moving said magazine and member intermittently.

37. The combination with a movable magazine provided with a plurality of pockets adapted to contain articles, means for removing articles from such pockets, means for restoring the articles to the pockets from which they were removed, actuators for both such means, a movable member provided with control factors which control said actuators and predetermine the pockets containing the articles to be handled by said removing and restoring means, means for moving said magazine and member intermittently and for actuating the article removing and restoring means when the magazine and member are at rest.

38. The combination with a movable magazine provided with a plurality of pockets, each pocket being adapted to contain a single article, means for handling the articles in certain pockets, actuators for said means and a movable plate provided with control factors which control said actuators and predetermine the pockets containing the articles to be handled.

39. The combination with a movable magazine provided with a plurality of pockets, each pocket being adapted to contain a single article, means for handling the articles in the pockets, actuators for said means, a movable member provided with control factors which control said actuators and predetermine the pockets containing the articles to be handled by the handling means and means for moving said magazine and member intermittently.

40. The combination with a movable magazine provided with a plurality of pockets, each pocket being adapted to contain a single article, means for handling the articles in the pockets, actuators for said means, a movable member provided with control factors which control said actuators and predetermine the pockets containing the articles to be handled by the handling means and means for moving said magazine and member intermittently and for actuating said handling means when the magazine and member are at rest.

Signed by me at New York, N. Y., this twenty-fourth day of November, 1928.

JOHN L. BABER, Jr.